United States Patent [19]

Suttie

[11] Patent Number: 4,952,789

[45] Date of Patent: Aug. 28, 1990

[54] MACHINING METHOD AND APPARATUS

[75] Inventor: David G. Suttie, Cossington, England

[73] Assignee: Amchem Company Limited, Leicestershire, England

[21] Appl. No.: 342,901

[22] Filed: Apr. 21, 1989

[30] Foreign Application Priority Data

Apr. 23, 1988 [GB] United Kingdom ............... 8809666

[51] Int. Cl.$^5$ ............................................. B23K 26/00
[52] U.S. Cl. ........................... 219/121.68; 219/121.69; 219/121.62; 219/121.82
[58] Field of Search ....................... 219/121.68, 121.69, 219/121.7, 121.71, 121.82, 121.78, 121.62

[56] References Cited

U.S. PATENT DOCUMENTS

| | | | |
|---|---|---|---|
| 4,218,606 | 8/1980 | Whitman, III | 219/121.7 X |
| 4,240,448 | 12/1980 | Heitmann et al. | 219/121.7 X |
| 4,249,545 | 2/1981 | Gretz et al. | 219/121.7 X |
| 4,297,559 | 10/1981 | Whitman, III | 219/121.71 X |
| 4,720,619 | 1/1988 | Mattei et al. | 219/121.7 |

Primary Examiner—C. L. Albritton
Attorney, Agent, or Firm—Charles E. Brown; Charles A. Brown

[57] ABSTRACT

A method of machining a workpiece at a plurality of working positions, employing a pulsed laser under external control, comprises effecting continuous relative movement of the workpiece and the laser the rate of movement being synchronized with the laser firing so that on successive laser pulses the laser beam is aligned with different work positions on the workpiece. Apparatus for machining a workpiece according to this method comprises a mechanism for effecting continuous relative movement of the workpiece and a pulsed laser operable under external control, a position transducer to determine the relative positioning of the workpiece and the laser, and a closed feedback control loop to ensure that each time the laser is pulsed it is aligned with a predetermined work position on the workpiece, the rate of movement being similar to the rated pulse repetition rate where possible.

9 Claims, 2 Drawing Sheets

MACHINING METHOD AND APPARATUS

The invention relates to machining methods and apparatus, and particularly to cutting or drilling (covered herein by the generic term "machining") with a pulsed laser which has to effect a separate machining operation at each of a plurality of spaced positions on a workpiece.

With such a machining operation, it is usual to complete machining at one position on the workpiece, employing the requisite number of pulses of the pulsed laser for this purpose, and then to effect a relative indexing movement of the workpiece and the laser whilst the latter is switched off. The indexing time is generally large as compared with the actual machining time, so that the laser is actually idle for most of the time and the aim of the invention is to improve productivity in this respect.

To this end a method of machining a workpiece at a plurality of working positions, employing a laser in pulsed mode, comprises effecting continuous relative movement of the workpiece and the laser whilst the latter is continuously pulsed, the pulsing of the laser being synchronized with the movement so that on successive laser pulses the laser beam is aligned with different work positions on the workpiece.

As will be appreciated the method of the invention is of particularly advantageous applications to the pulsed-laser drilling of a ring of holes in a workpiece, which can be indexed with a purely rotational relative movement of workpiece and laser about the center of the pitch circle of the holes. A typical example is the drilling of a ring of holes in a spinaret or in a combustion ring for an aircraft gas turbine engine, and the pulsing of the laser is linked to the rotational position of the workpiece such that successive laser pulses impinge at successive hole positions on the workpiece. Thus the number of complete rotations of the workpiece during a complete working cycle is equal to the number of laser pulses required to "break through" when drilling a hole, as a separate static operation, and no time is wasted by the indexing movement which entirely occurs in the off time of the laser between pulses.

It will, of course, be appreciated that any arrangement of the work positions can be accommodated with appropriate continuous relative movement of the workpiece. However, the invention is mainly appropriate for percussion laser drilling of holes in a component with the holes disposed in a circular or linear arrangement.

Apparatus for machining a workpiece according to the invention comprises means for effecting continuous relative movement of the workpiece and a laser operable in pulsed mode, position transducer means to determine the relative positioning of the workpiece and the laser, and a closed feedback control loop to ensure that the laser is pulsed each time it is aligned with a predetermined work position on the workpiece.

Preferably the means for effecting relative movement are operative to move the workpiece with the laser remaining stationary during a machining cycle, the feedback control loop being such that the laser is pulsed when aligned with successive work positions on the workpiece during the continuous relative movement of the latter.

In a preferred embodiment a rotary workpiece holder or mounting is driven at an approximately constant speed by an electric motor, and a position feedback loop includes an angular position transducer rotatably coupled to the workpiece holder or mounting to determine each instant at which a laser, focused on the workpiece, is fired at the workpiece. The rotary speed is chosen such that the rate at which work positions pass the laser approximately equals the rated pulse repetition rate of the laser to be utilized, thus enabling the maximum average power of the laser to be applied constantly to the workpiece with minimal laser dead time.

The invention will now be further described with reference to the accompanying schematic drawings which illustrate, by way of example, an embodiment of the invention applicable to the laser drilling of a circle of peripheral holes in an annular workpiece.

Figure 1:
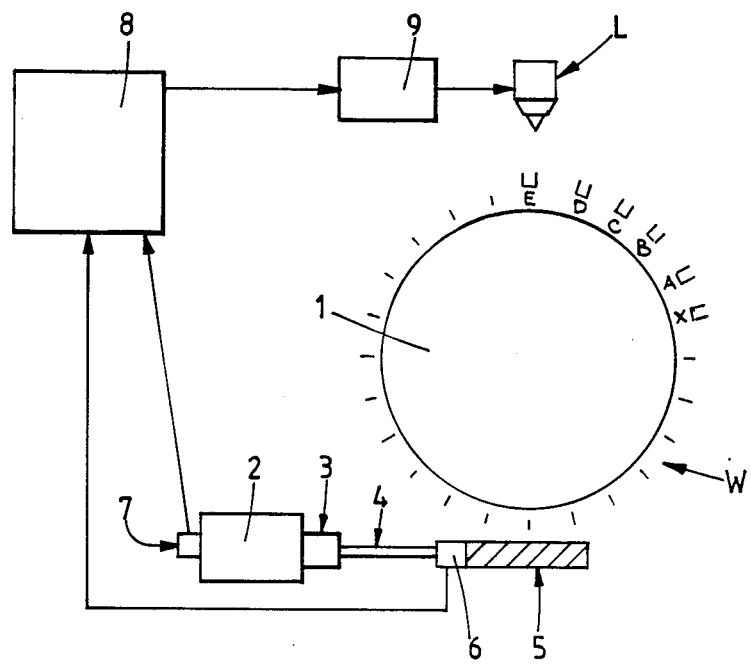
FIG. 1 is a schematic view of a machining apparatus in accordance with the invention.

A workpiece W of 18 inch diameter, 120/1000 inch thick stainless steel, is mounted on a workpiece support comprising a rotary table 1 which is rotated by a 2.1 Nm torque D.C. servomotor 2 via a gearbox 3, a shaft 4 and a worm and wheel arrangement 5. Angular position transducers are provided on the motor shaft and on the worm and wheel arrangement 5. The transducers 6, 7 are typically incremental encoders (Heidenhaim) with associated electronics giving a square wave quadrative output with five fold interpolation so as to give an output of 500 pulses per degree of rotation at the table 1. YAG solid state pulsed laser (M34 Coherent General Inc, U.S.A.) L, operative under external control is focused on to the surface of the workpiece W and operates to drill a succession of holes indicated as a, b, c, d, e, . . . x in and through the periphery of the annular workpiece W as the latter rotates. The laser L is modified in a known manner such that an external signal can be used to cause the laser to fire (normal input signal +15v, switch to 0v causing firing).

Figure 2:
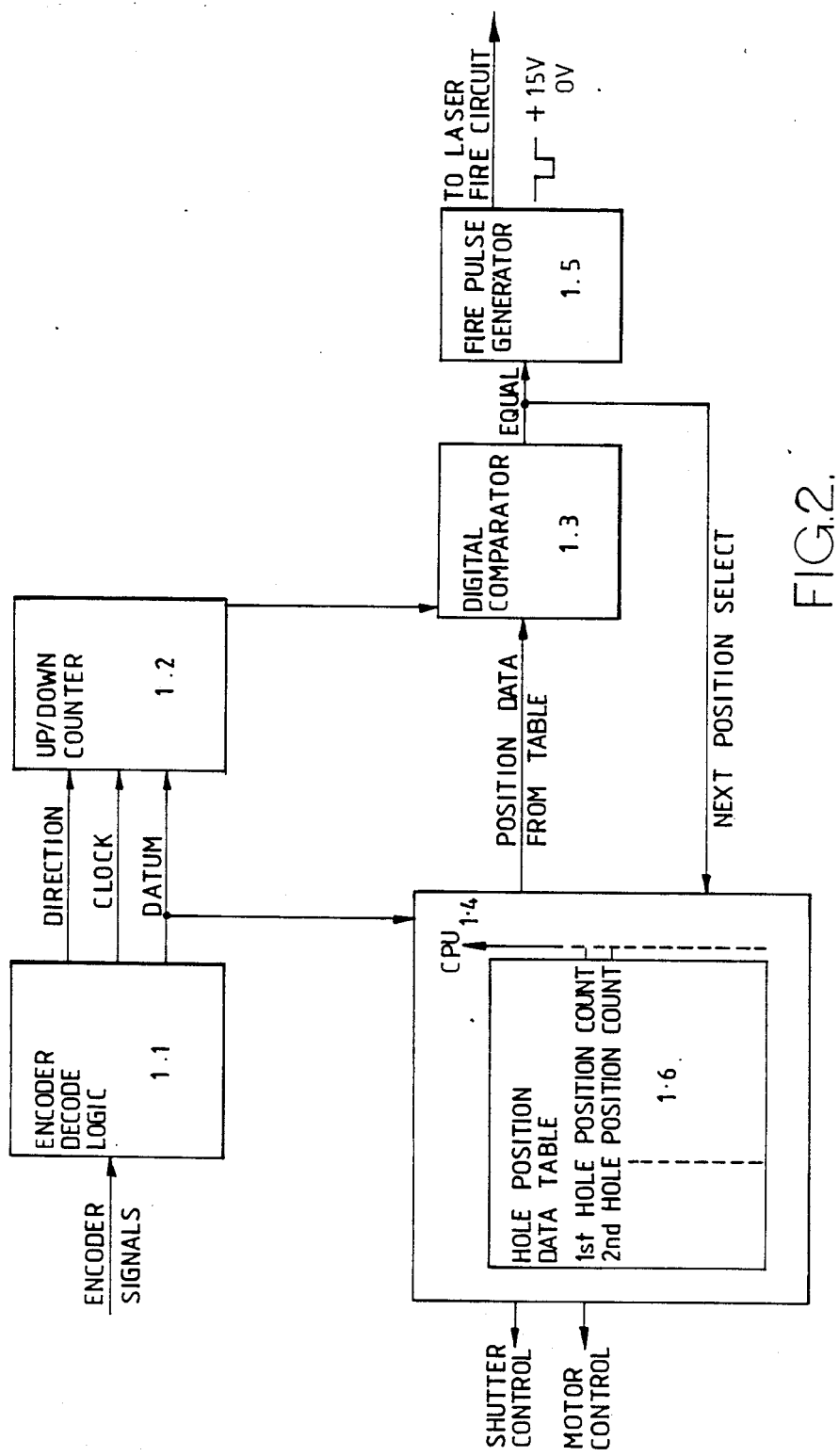
FIG. 2 is a schematic view of the control system for the machining apparatus.

The laser L, its associated power supply 9 and the other system components described above are all controlled by a central control arrangement 8 which is shown in further detail in FIG. 2.

The main functional components of the arrangement 8 are as follows:

1.0 Control Elements

FIG. 2 shows the following major elements:

1.1. Transducer/encoder decode logic taking signals from the transducers 6, 7 and producing three main outputs:
 (a) a direction signal, indicating the direction of travel of the transducer and attached axis (table 1)
 (b) a clock signal, giving a square wave output indicating incremental movement at the transducer
 (c) a datum signal, indicating the "Home Marker" position on the transducer.

1.2. An Up Down Counter

This is fed by the three signals described in 1 above and holds an absolute count indicating the current position at the axis relative to the "Home Marker" position on the transducer.

1.3. A Digital Comparator

This is used to compare the current value held in the Up/Down Counter 1.2. with a value passed from the CPU 1.4.

1.4. A CPU

This is used to both control the overall function of the system for reset and power-up and also to control the transfer of data from the Hole Position Data Table 1.6 to the Comparator 1.3.

1.5. A Fire-Pulse Generator

This circuit produces a short pulse whenever the output of the comparator 1.3 indicates equality of the values from the counter 1.2 and the CPU/Table 1.4, 1.6. This pulse is used by the laser to initiate the firing of the flashlamps.

1.6 A Hole Position Data Table

This is a pre-programmed look up table accessed by the CPU which has a unique position entry for each hole to be drilled.

2.0 Principle of Operation

2.1. Initialization

To initialize the system the table is positioned such that about a 5° rotation is required to reach the home marker (zero) position indicator and the laser shutter is forced closed.

2.2. Operation

The table is commanded to move in a positive direction by the controller 8 at an approximately constant speed on passing through the home marker position the following will occur as a result of the datum signal being detected.

(i) the laser shutter will be opened
(ii) the Up/Down counter 1.2 will be reset to zero
(iii) the CPU will access the first entry in the data table 1.6 and pass it to the Comparator 1.3

As the table continues to move, the count value from the transducer 6 in the Up/Down counter 1.2 will eventually become equal to that stored in the comparator 1.3. At this time an equal signal will be passed to the Fire-Pulse Generator 1.5 causing the laser to fire a single pulse.

The equal signal from the comparator also goes to the CPU 1.4 which will then access the next entry in the data table 1.6 and pass it to the comparator 1.3.

The above sequence is repeated until, in the case of a rotary table the "Home Marker" position is again reached at which time the Up/Down 1.2 is again zeroed and the CPU 1.4 resets its data pointer to top of the Data Table 1.6.

The system is thus ready to begin a second revolution of the axis without interruption to the axis motion.

As will be appreciated from the above description, the position of the table 1 is indicated by the output from the transducers/encoders 6,7, particularly transducer 6 on the worm drive. This information is used by the controller 8 to cause the laser to fire when the workpiece W is aligned with the laser at any of positions A,B,C,D,E . . . X for holes to be drilled. The peripheral speed of the workpiece W is usually arranged such that the rate of presentation of hole positions to the laser L is approximately equal to the rated pulse repetition rate of the laser thus reducing the laser dead time to a minimum. However, it is to be noted that the firing rate of the laser L is determined by the position of the table 1, not by time and so the time between firing pulses can vary. Typically, 3 holes are drilled per degree of rotation and the table rotates at approximately 6°s⁻¹ giving about 500 holes per revolution.

As the position of the table 1 and workpiece W can be accurately determined and used to fire the laser L, it is not necessary that the laser should penetrate the workpiece in one firing as the system allows multiple passes of the workpiece until the required hole depth is drilled e.g. 5 passes to drill a 20/1000 inch diameter hole 4mm deep.

It will be appreciated that although in the above description the holes are equally spaced, the invention is not restricted in this respect since any selected pattern of irregularly spaced holes may be machined. However, where there are large spacings between groups of holes, the laser shutter will need to be closed and this can be achieved under control using a coarse position indicator, e.g. transducer 7. Furthermore, by using information from more than one axis to synchronize the laser movement, for example by the use of an X-Y table, any desired hole pattern can be produced in accordance with a central machine programme.

I claim:

1. A method of machining a workpiece, said method comprising the steps of:
    providing a pulsed laser and directing the pulsed laser at a workpiece;
    mounting the workpiece in a moveable holder for effecting adjustment of the altitude of the workpiece to the laser;
    simultaneously firing the laser while continuously adjusting the altitude of the workpiece by movement of the holder whereby on successive pulses of the laser the laser beam is aligned with different work positions on the workpiece;
    synchronizing the firing of the laser with the movement of the holder whereby movement of the workpiece to a different work position occurs during non-firing of the laser to reduce dead time of the laser; and
    moving the workpiece a plurality of times past the laser whereby each work position is contacted by the laser beam more than once to bring the work positions to a preselected depth.

2. The method as claimed in claim 1, wherein the holder is a rotary holder and the workpiece mounted in the rotary holder is moved at a rate of rotation, and the firing of the laser is synchronized with the rate of rotation.

3. The method as claimed in claim 1, including providing on the holder a transducer having an output indicating the position of the holder, and feeding the output of the transducer to a control circuitry for the laser to affect the pulsing of the laser.

4. The method as claimed in claim 1, maintaining the rate of movement of the workpiece in close relation to the rated pulse repetition rate of the laser whereby firing of the laser occurs each time a new work position is presented.

5. The method as claimed in claim 1, wherein the work positions machined in the workpiece is a circular arrangement of holes.

6. The method as claimed in claim 1, including focusing the laser upon the work positions to determine the depth of the work position machined by the laser beam in the workpiece to determine the number of times the workpiece must pass before the laser to attain a predetermined size for the work position.

7. The method as claimed in claim 6, wherein each work position machined by the laser is a hole and the size of each hole is directed to the diameter of the hole.

8. An apparatus for machining a workpiece, said apparatus comprising a pulse laser, a power supply and focusing means for powering the laser to produce a laser beam and for focusing the laser beam upon the workpiece, a moveable workpiece holder for holding the workpiece before said laser whereby the laser beam can act upon the workpiece at a work position, position transducer means being positioned adjacent said workpiece holder for indicating the position of the workpiece to said laser, and control means for controlling the firing of said laser whereby said laser is fired each time a new work position on the workpiece is presented to said laser, said control means being connected to said holder and said laser to synchronize movement of said holder with the firing of said laser via a closed feed back control loop whereby dead time of laser is minimized, said control means moves said holder repeatedly to allow repeated passes of the workpiece past said laser whereby a predetermined depth for each workpiece is obtained.

9. The apparatus as claimed in claim 8, wherein said holder is a rotary holder.

* * * * *